US012608103B2

(12) United States Patent
Ogirko et al.

(10) Patent No.: US 12,608,103 B2
(45) Date of Patent: Apr. 21, 2026

(54) TOUCH SENSING

(71) Applicant: Cypress Semiconductor Corporation, San Jose, CA (US)

(72) Inventors: Roman Ogirko, Lviv (UA); Vasyl Mandziy, Schyrets (UA); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/891,218

(22) Filed: Sep. 20, 2024

(65) Prior Publication Data
US 2026/0086673 A1 Mar. 26, 2026

(51) Int. Cl.
*G06F 3/041* (2006.01)
*G06F 3/044* (2006.01)
(52) U.S. Cl.
CPC ........ *G06F 3/04166* (2019.05); *G06F 3/0418* (2013.01); *G06F 3/0446* (2019.05)
(58) Field of Classification Search
CPC ... G06F 3/04166; G06F 3/0418; G06F 3/0446
See application file for complete search history.

(56) References Cited

U.S. PATENT DOCUMENTS

| | | | |
|---|---|---|---|
| 11,954,288 B1 * | 4/2024 | Wang | G06N 3/044 |
| 2014/0015774 A1 * | 1/2014 | Bussat | G06V 10/30 |
| | | | 345/173 |
| 2015/0309610 A1 * | 10/2015 | Rabii | G06F 3/041662 |
| | | | 345/174 |
| 2016/0195985 A1 * | 7/2016 | Shinya | G06F 3/0418 |
| | | | 345/173 |
| 2018/0181245 A1 * | 6/2018 | Beck | G06F 3/0418 |
| 2018/0196575 A1 * | 7/2018 | Yarosh | G06F 3/042 |
| 2022/0187942 A1 * | 6/2022 | Kwak | G06F 3/04166 |

* cited by examiner

*Primary Examiner* — Md Saiful A Siddiqui

(57) ABSTRACT

One or more computing devices, systems, and/or methods are provided. In an embodiment of the techniques presented herein, a touch detection system, comprises a touch sensor array comprising unit cells, a transmit sequencer configured to generate an excitation signal, an analog-to-digital-converter unit configured to measure responses of the unit cells to the excitation signal and, a processing unit configured to generate a first capacitance map based on the responses, filter the first capacitance map, by rows, in a first band pass filter to generate a second capacitance map, and detect a touch event based on the second capacitance map.

16 Claims, 10 Drawing Sheets

900

Figure 3:
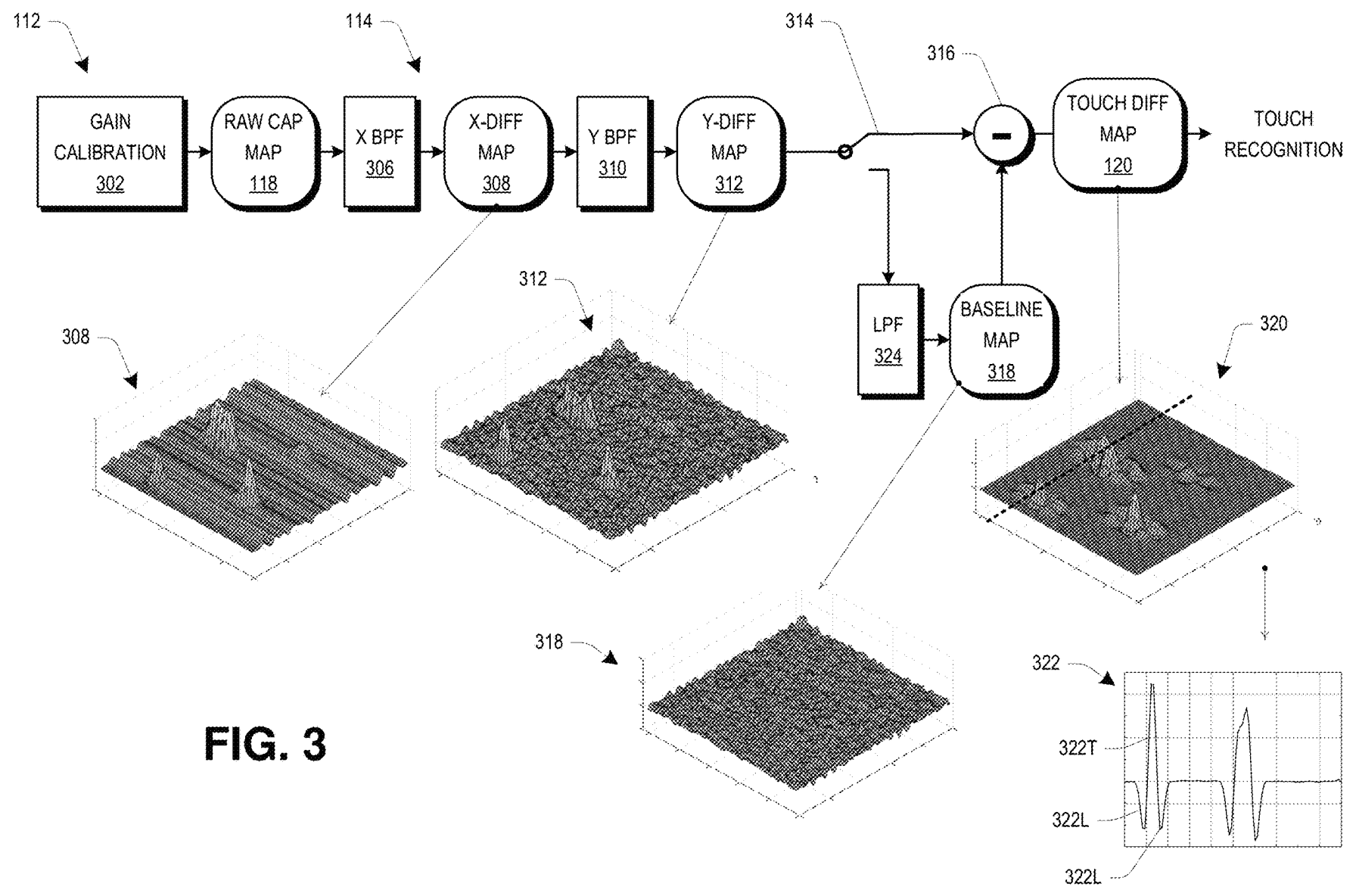

TOUCH
RECOGNITION

320

TOUCH DIFF
MAP
120

322T
322L
322L

322

316

BASELINE
MAP
318

314

LPF
324

Y-DIFF
MAP
312

318

Y BPF
310

312

X-DIFF
MAP
308

X BPF
306

114

RAW CAP
MAP
118

GAIN
CALIBRATION
302

Simple Discrete Wavelet patterns

| Index | | -6 | -5 | -4 | -3 | -2 | -1 | 0 | 1 | 2 | 3 | 4 | 5 |
|---|---|---|---|---|---|---|---|---|---|---|---|---|---|
| Scale | Name | | | | | | | | | | | | |
| 1 | DW1 | | | | | | -1 | 2 | -1 | | | | |
| 2 | DW2 | | | | -1 | -1 | 2 | 2 | -1 | -1 | | | |
| 3 | DW3 | | | -1 | -1 | -1 | 2 | 2 | 2 | -1 | -1 | -1 | |
| 4 | DW4 | -1 | -1 | -1 | -1 | 2 | 2 | 2 | 2 | -1 | -1 | -1 | -1 |

402

400

900

SCAN UNIT CELLS OF TOUCH SENSOR ARRAY TO GENERATE FIRST CAPACITANCE MAP — 902

FILTER FIRST CAPACITANCE MAP, BY ROWS, IN FIRST BAND PASS FILTER TO GENERATE SECOND CAPACITANCE MAP — 904

DETECT TOUCH EVENT BASED ON SECOND CAPACITANCE MAP — 906

TOUCH SENSING

BACKGROUND

Computing devices, such as notebook computers, personal data assistants (PDAs), mobile handsets, etc. have user interface devices, such as touch-sensor pads (also commonly referred to as touchpads), touch-sensor sliders, touch-sensor buttons, touch-sensor keyboards, touch screens, and touch panels. Capacitance-sensing devices are, at times, used to replace mechanical buttons, knobs, and other similar mechanical user interface controls in user interface devices. Capacitance-sensing devices have relatively few complicated mechanical switches and buttons, and can generally provide reliable operation under harsh conditions. In addition, capacitance-sensing devices are widely used in modern customer applications, providing new user interface options in existing products.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method for touch detection comprises scanning unit cells of a touch sensor array to generate a first capacitance map, filtering the first capacitance map, by rows, in a first band pass filter to generate a second capacitance map, and detecting a touch event based on the second capacitance map.

In an embodiment of the techniques presented herein, a system for touch detection comprises means for scanning unit cells of a touch sensor array to generate a first capacitance map, means for filtering the first capacitance map, by rows, in a first band pass filter to generate a second capacitance map, and means for detecting a touch event based on the second capacitance map.

In an embodiment of the techniques presented herein, a touch detection system, comprises a touch sensor array comprising unit cells, a transmit sequencer configured to generate an excitation signal, an analog-to-digital-converter unit configured to measure responses of the unit cells to the excitation signal, and a processing unit configured to generate a first capacitance map based on the responses, filter the first capacitance map, by rows, in a first band pass filter to generate a second capacitance map, and detect a touch event based on the second capacitance map.

In an embodiment of the techniques presented herein, a touch detection system comprises a display comprising a touch sensor array having transmit lines and receive lines, a transmit sequencer configured to generate excitation signals, by transmit line, on the touch sensor array, an analog-to-digital-converter unit configured to measure responses of the receive lines to the excitation signals, and a processing unit configured to generate a first capacitance map based on the responses, filter the first capacitance map, by rows, in a first band pass filter to generate a second capacitance map, and detect a touch event based on the second capacitance map.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 is a diagram illustrating the processing of a capacitance map, in accordance with some embodiments.

DETAILED DESCRIPTION

Figure 1:
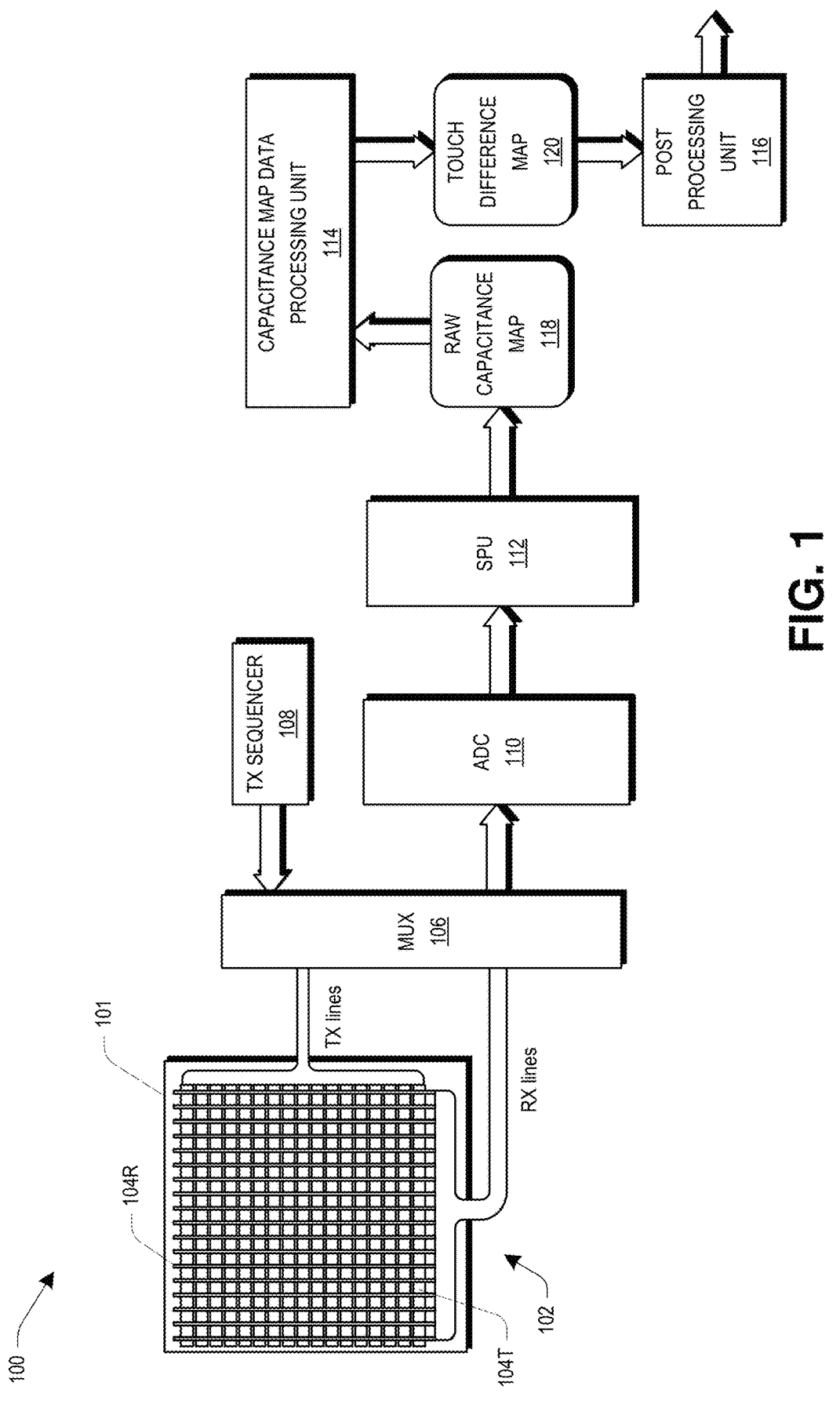
FIG. 1 is a block diagram of a touch sensing system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1 is a block diagram of a touch sensing system 100, in accordance with some embodiments. In some embodiments, the touch sensing system 100 comprises a display 101 comprising a touch sensor array 102 comprising transmission (TX) lines 104T and receive (RX) lines 104R, a multiplexer 106, a TX sequencer 108, an analog-to-digital converter (ADC) 110, a signal processing unit (SPU) 112, a capacitance map processing unit 114, and a post processing unit 116.

In some embodiments, the touch sensing system 100 employs capacitive sensing to determine a touch location on a human machine interface (HMI) that provides user input to a device, such as a smartphone, a tablet, a laptop computer, a controller, or some other user interface. The HMI may employ a touch sensitive display that acts as an output device and an input device. The TX lines 104T and the RX lines 104R defines a grid of orthogonal electrodes. The crossing points of the TX lines 104T and the RX lines 104R define unit cells of the touch sensor array 102. In some embodiments, the TX lines 104T are horizontal and the RX lines 104R are vertical.

Excitation signals are injected on TX lines 104T and the responses to the excitation signal are measured on the RX lines 104R. For example, the responses of the RX lines 104R may be measured in parallel responsive to the excitation of a single TX line 104T. The TX injection and RX measurement is repeated for each of the TX lines 104T until a scan cycle is completed. The TX sequencer 108 injects the excitation signal on a TX line 104T selected by the multiplexer 106. In some embodiments, the multiplexer 106 routes each of the RX lines 104R to a separate ADC module so that the responses can be measured in parallel. The SPU 112 samples data generated by the ADC 110 for each of the TX lines 104T to generate a raw capacitance map 118 for the complete scan cycle. In some embodiments, the SPU 112 processes the data from the ADC 110 for noise reduction, gain equalization, etc. In some embodiments, the capacitance map processing unit 114 processes the raw capacitance map 118 to address inhomogeneity of the touch sensor array 102 to generate a touch difference map 120.

Figure 2:
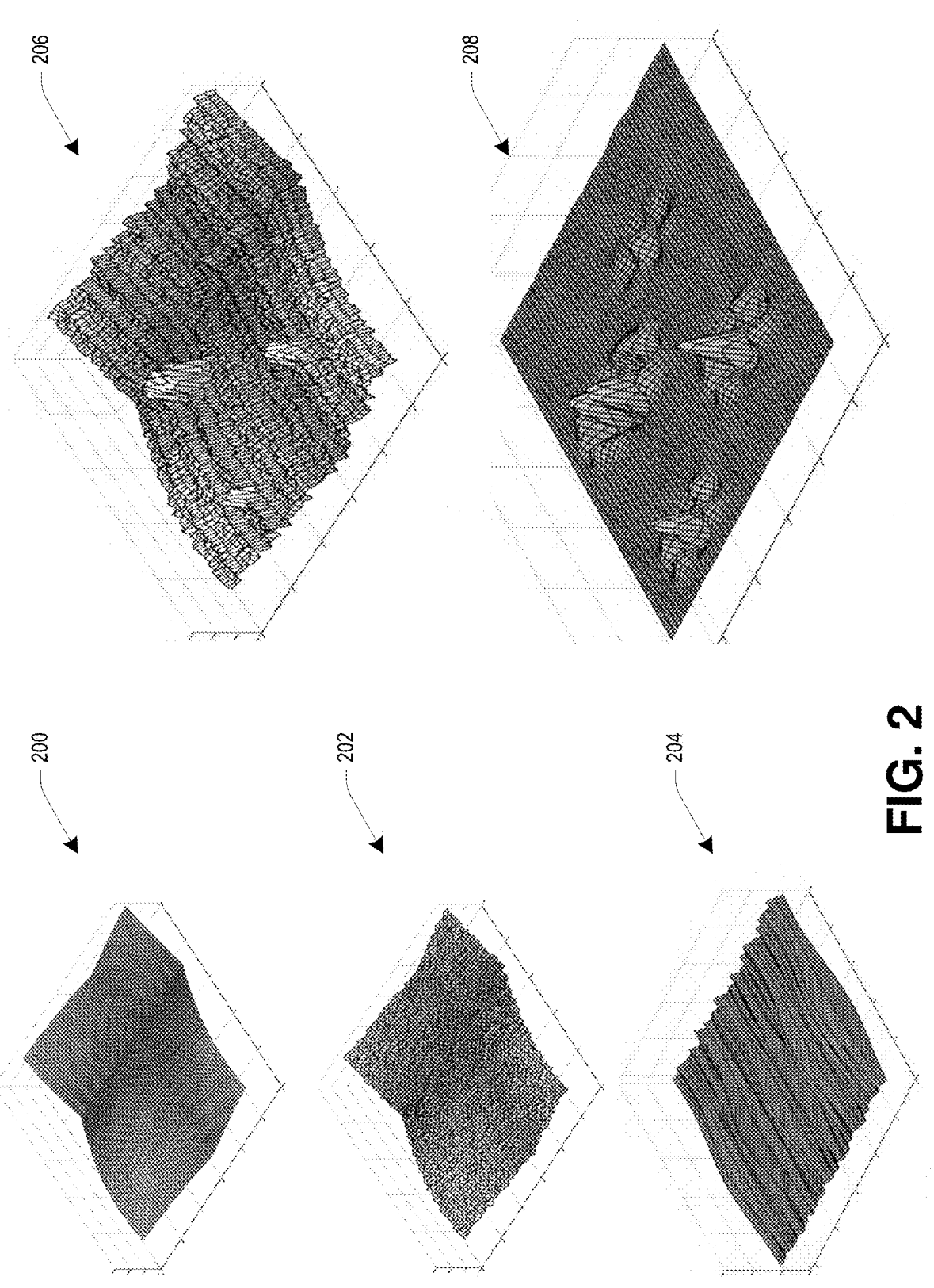
FIG. 2 is a diagram illustrating sources of sensor inhomogeneity, according to some embodiments.

FIG. 2 is a diagram illustrating sources of sensor inhomogeneity, according to some embodiments. The post processing unit 116 processes the touch difference map 120 to recognize touch events, calculate one or more touch positions (i.e., single touch or multi-touch), determine touch properties, such as movement direction, or recognize gestures (i.e., over multiple scan cycles). In some embodiments, the post processing unit 116 identifies touch events based on the amplitude of the data in the touch difference map 120, based on image recognition of data in the touch difference map 120, or by some other detecting technique. In some embodiments, one or more of the SPU 112, the capacitance map processing unit 114, or the post processing unit 116 may be implemented by a shared processing resource.

The capacitance of the unit cells forms a surface SF[x,y] where some deformation caused by touches is observed. These deformations are informative for recognizing the touch position. The deformation of the capacitance of the unit cell under touch is considered a touch signal. The shape of the touch image depends on the size of the finger. The value of the signal depends on the distance from the finger to the unit cells of the touch sensor array 102. The maximum signal occurs when bare fingers touch the sensor array. If the finger is covered with a glove, this distance increases and the signal value decreases (e.g., approximately 4-5 times). The touch signals are represented by a matrix FN[x,y].

The surface of the touch sensor array 102 is not completely flat, giving rise to a first source of inhomogeneity illustrated in a diagram 200 in FIG. 2. Sensor routing and imperfect stack-up lead to surface deformation. The unit cell value can be represented as the sum of the rated value of the sensor and its deviation caused by the design:

$$Cm_{x,y}=Cmr+Cmv_{x,y},$$

where Cmr is the rated value of the sensor baseline and Cmv is the unit cell value variation.

Random dispersion of the sensor signals caused by the imperfect geometry of the unit cells due to the imperfection of the technology is another source of inhomogeneity in the touch sensor array 102, as illustrated in the diagram 202 of FIG. 2 (combined with the surface inhomogeneity of the diagram 200). The unit cell signal change can be written as:

$$Cmv_{x,y}==Cmvs_{x,y}+Cmvr_{x,y},$$

where Cmvs is the smooth variation of the unit cell signals and Cmvr is the random variation of the unit cell signals. The sensor signals (e.g., capacitance) on the surface of the touch sensor array 102 varies in temperature and time due to variation of the sensor geometry. The range of the sensor values can be assessed as:

$$Cmv_{x,y}=(1\pm0.01)\cdot(Cmvs_{x,y}+Cmvr_{x,y}).$$

A significant source of touch signal distortion is noise from the display 101, as shown in the diagram 204 in FIG. 2. Display noise may be considered as somewhat common-mode for each row and random from row to row. One component of the display noise is created by the data lines that define the image. In addition, non-uniformity of the coupling capacitance between the touch sensor array 102 and the display structure distorts the common-mode noise properties. The display noise for each row is represented by the common-mode component scaled by a non-uniformity function:

$$DispN_{x,y}=CMN_y\cdot NU_{x,y}.$$

where $CMN_y$ is the row common-mode component and $Nu_{x,y}$ is the non-uniformity function.

The measured signal 206 is sum of the touch signals, the sensor surface inhomogeneities, and the display noise:

$$X=FN_{x,y}+Cmr+Cmvs_{x,y}+Cmvr_{x,y}+CMN_y\cdot NU_{x,y}.$$

The sensor signals along one row can be considered as a series of samples of a limited number. The number of samples is equal to the number of RX lines 104R. The signal along the RX lines 104R appears as a biased, slowly changing curve with random deviations and a variation in the signal at the point of the touch. The processing by the capacitance map processing unit 114 reduces bias, mitigates variation, and preserves the touch signal to attempt to generate a zero-biased surface map with touch signals, as shown in a diagram 208 of FIG. 2.

FIG. 3 is a diagram illustrating the processing of the capacitance map, in accordance with some embodiments. The processing may be completed by one more processing units, such as the SPU 112, the capacitance map processing unit 114, the post processing unit 116, or a shared processing resource. In some embodiments, the SPU 112 implements a gain calibration block 302. The SPU 112 employs channel conversion factors aligned using a gain calibration procedure that starts before the normal operation. The gain calibration procedure implies that all channels consistently measure the same value. Measurements during the gain calibration procedure are used to calculate the correction factor for each channel according to:

$$Kg[RX]=Xc[M]/Xc[RX]$$

where Xc is the result of measurement of the calibration value, M is the channel number that is selected as a reference, and [RX] is the measurement channel number. All measurements collected during normal operation are multiplied by the corresponding correction factors to generate the raw capacitance map 118. The gain calibration procedure is activated at system start up and when the ambient temperature changes sufficiently to cause a significant change in conversion factor nonuniformity, for example, when expected the conversion factor nonuniformity is 2-3 times more than calibration accuracy.

In some embodiments, the capacitance map processing unit 114 comprises an x-direction band pass filter (X BPF) 306 to generate an X-direction difference map 308, an optional y-direction band pass filter (Y BPF) 310 to generate a y-direction difference map 312, and a switch 314 configured to provide the filtered data to a subtraction unit 316 during normal operation mode, which subtracts a baseline map 318 from the filtered data map 312 to generate the touch difference map 120 for use in touch recognition. The diagram 322 illustrates one X-direction row of data in the touch difference map 120.

In some embodiments, the X BPF 306 filters each row of unit cell data of the raw capacitance map 118, for example, in a first direction corresponding to the RX lines 104R measurement associated with a single TX line 104T. The X BPF 306 filters sensor surface inhomogeneities to generate the X-direction difference map 308. If the gain variation during operation is not compensated with the calibration procedure 112 an additional nonuniformity in direction orthogonal (along columns) to X-BPF may appear. In some embodiments, the Y BPF 310 filters each column of unit cell data of the raw capacitance map 118, for example, in a second direction corresponding to the TX lines 104T. The Y BPF 310 filters display noise and conversion factor variation to generate the Y-direction difference map 312.

During a calibration mode with no touch events, the switch 314 provides the filtered data (one of the difference maps 308, 312) to a low pass filter 324, which filters the filtered data to generate the baseline map 318. In some embodiments, the baseline map 318 represents average nonuniformity of the touch sensor array 102 not removed by the filtering. In some embodiments, the baseline map 318 is generated during the manufacturing process to characterize the touch sensor array 102. The baseline map 318 may also be periodically updated or updated in response to triggering events, such as temperature changes.

Note that the diagram 322 exhibits side lobes 322L around a touch signal 322T. In some embodiments, the side lobes 322L are generated by the X BPF 308. The side lobes 322L are opposite in polarity to the touch signal and do not interfere with touch detection or position calculation. If the Y BPF 310 is used positive magnitude side-lobes are generated around the touch signal as a response of negative side-lobes 322L. The magnitude of these side lobes around the touch signal 322T are comparable in magnitude to a gloved touch signal. The positive side lobes may interfere with an amplitude-based touch detection technique. However, the positive side lobes around the touch signal 322T are a feature that can be used in an image recognition technique to distinguish a finger touch from a false touch response.

Figure 4:
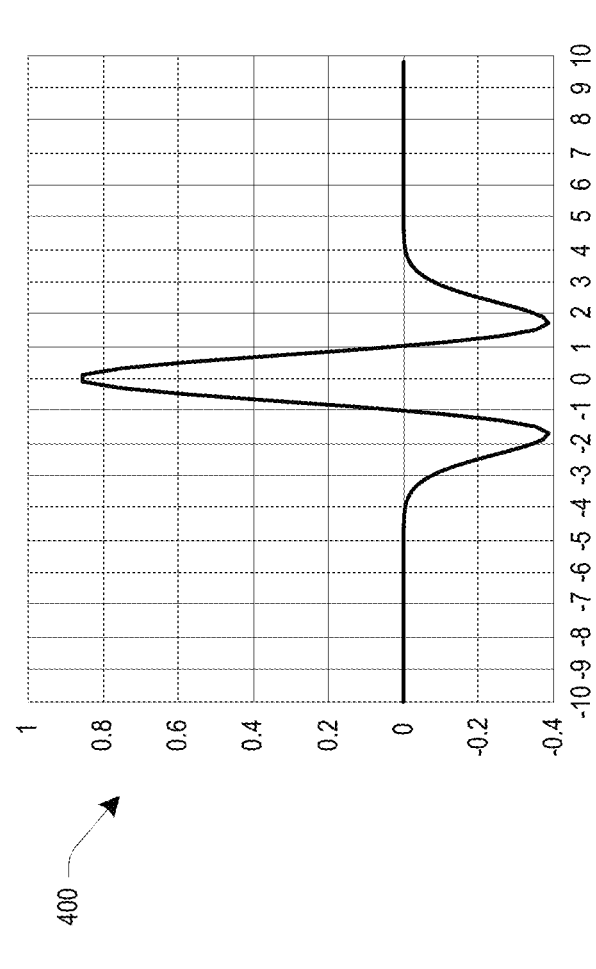
FIG. 4 is a diagram illustrating characteristics of a band pass filter, in accordance with some embodiments.

FIG. 4 is a diagram illustrating characteristics of a band pass filter, in accordance with some embodiments. In some embodiments, the X BPF 306 and the Y BPF 310 are finite impulse response (FIR) filters with a symmetrical wavelet pattern 400 for the tap weight factors. In some embodiments, the wavelet comprises a Ricker function, also referred to as a Mexican hat function. The width of wavelet determines the pass frequency, where increasing the wavelet width decreases the pass frequency. Table 402 in FIG. 4 illustrates tap weights for example approximations of Ricker wavelet functions of varying width. In some embodiments, the width of the Ricker wavelet function is selected based on the geometry of the touch sensor array 102 such that the width encompasses the number of unit cells for the largest finger touch to be detected.

Figure 5:
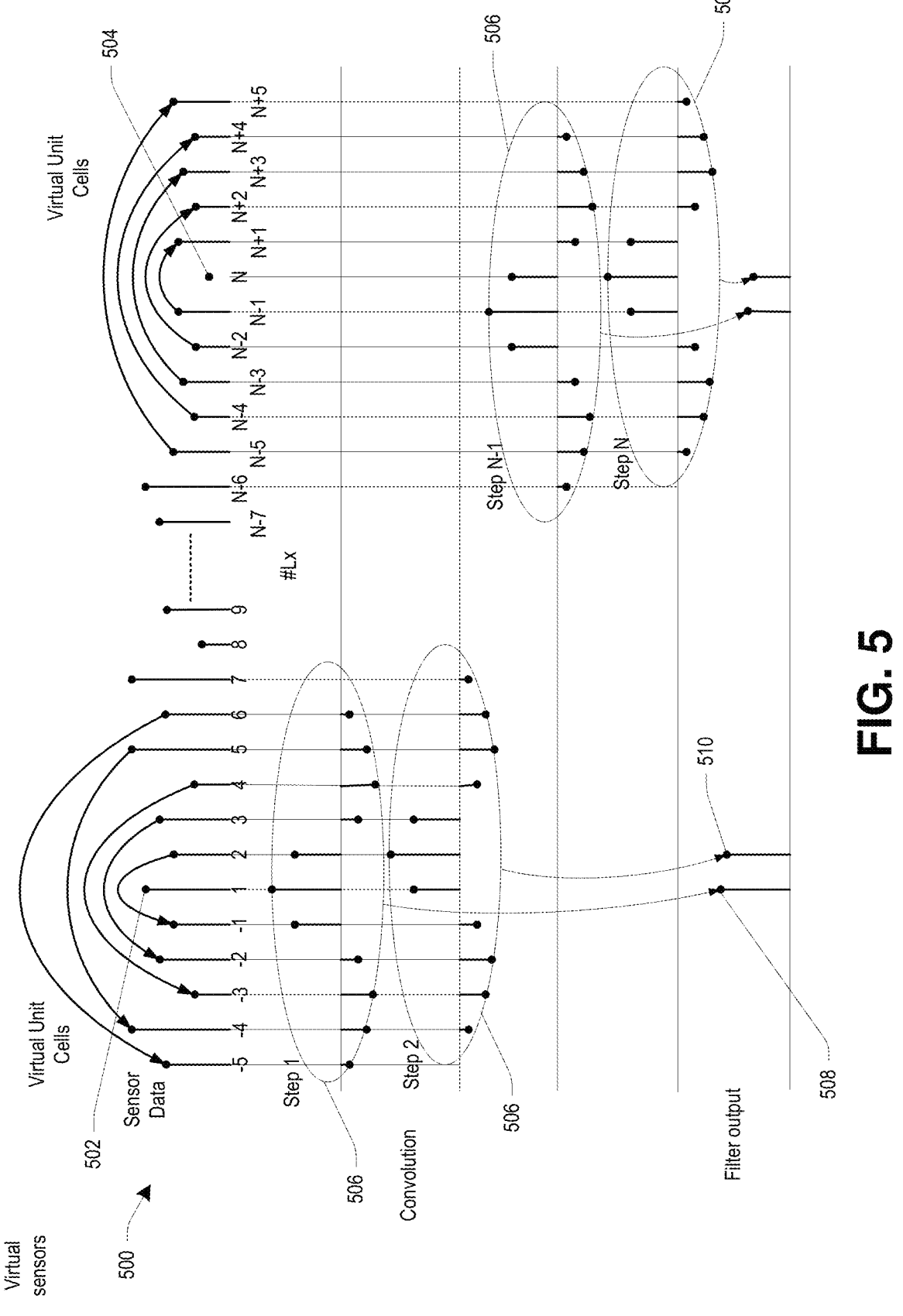
FIG. 5 is a diagram illustrating mirroring of unit cell data for filtering sensor data, in accordance with some embodiments.

FIG. 5 is a diagram 500 illustrating mirroring of unit cell data for filtering the sensor data, in accordance with some embodiments. The X BPF 306 filter operates on rows of data in a first direction corresponding to the RX lines 104R and the Y BPF 310 operates on columns of data in a second direction corresponding to the TX lines 104T. Filtering sensor data in the row or column at an edge of the touch sensor array 102 requires data that is not physically available given the fixed number of taps for implementing the wavelet function. For example, to get the filtering result for an edge unit cell 502 in the first column (L1 in FIG. 5), data is available from the L2, L3, . . . Lx unit cells to the right of the edge unit cell 502 at L1, but there are no physical unit cells to the left of the edge unit cell 502. Similarly, data is available from the LN-1, LN-2, . . . LN-x unit cells to the left of the edge unit cell 504 at LN, but there are no physical unit cells to the right of the edge unit cell 504. To improve the filtering response virtual sensors can be generated by extrapolation using sensor data located near the edges, but at the cost of a more comprehensive processing procedure. For example, data to the right of the edge unit cell 502 is mirrored to generate virtual unit cell data for the taps to the left of the edge unit cell 502, and data to the left of the edge unit cell 504 is mirrored to generate virtual unit cell data for the taps to the right of the edge unit cell 504.

FIG. 5 illustrates filter DW4 from the Table 402 with 11 taps where a sliding window 506 is used for generating filter outputs. For the edge unit cell 502, data from L2 is mirrored to L-1, data from L3 is mirrored to L-2, data from L4 is mirrored to L-3, data from L5 is mirrored to L-4, and data from L6 is mirrored to L-5. Similarly, data is mirrored for the edge unit cell 504.

A filter output 508 is generated for step 1 by performing a convolution with the taps defining the wavelet, the sensor data, and the virtual sensor data. Subsequently, the sliding window 506 is shifted right for step 2 and a filter output 510 is generated. The sliding window 506 continues to shift right to generate filer output for all of the unit cells in the row. The mirroring and filtering is repeated for each row in the associated map 118, 308.

Figure 6:
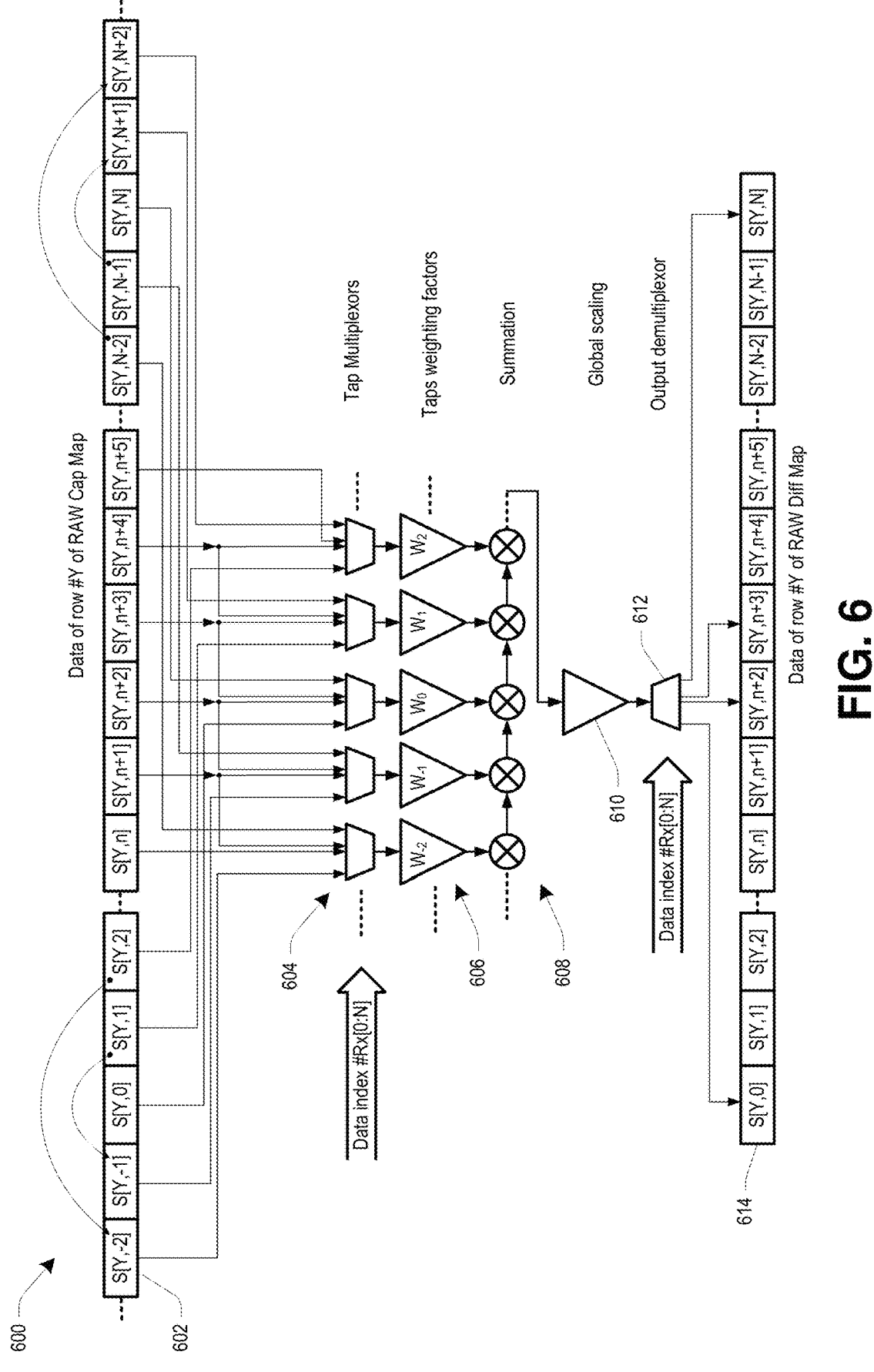
FIGS. 6 and 7 are simplified block diagrams of a band pass filter, in accordance with some embodiments.

FIG. 6 is a simplified block diagram of a band pass filter 600, in accordance with some embodiments. The band pass filter 600 may be used to implement the X BPF 306 or the Y BPF 310. A memory block 602 stores a row of unit cell data and the virtual unit cell data at the edges of the row. Tap multiplexers 604 select the unit cell data in the sliding window 506. Each tap multiplexer 604 is associated with a tap of the band pass filter 600. Gain units 606 set the weights of the filter taps. Summation units 608 add the weighted components. A scaling unit 610 applies a global scaling factor. An output multiplexer 612 maps the filter output to an entry in an output memory block 614 corresponding to the target unit cell. For the X BPF 306, the memory block 602 stores a row of the raw capacitance map 118, and the output memory block 614 corresponds to a row of the X-direction difference map 308. For the Y BPF 310, the memory block 602 stores a row of the x-direction difference map 308, and the output memory block 614 corresponds to a row of the y-direction difference map 312.

Figure 7:
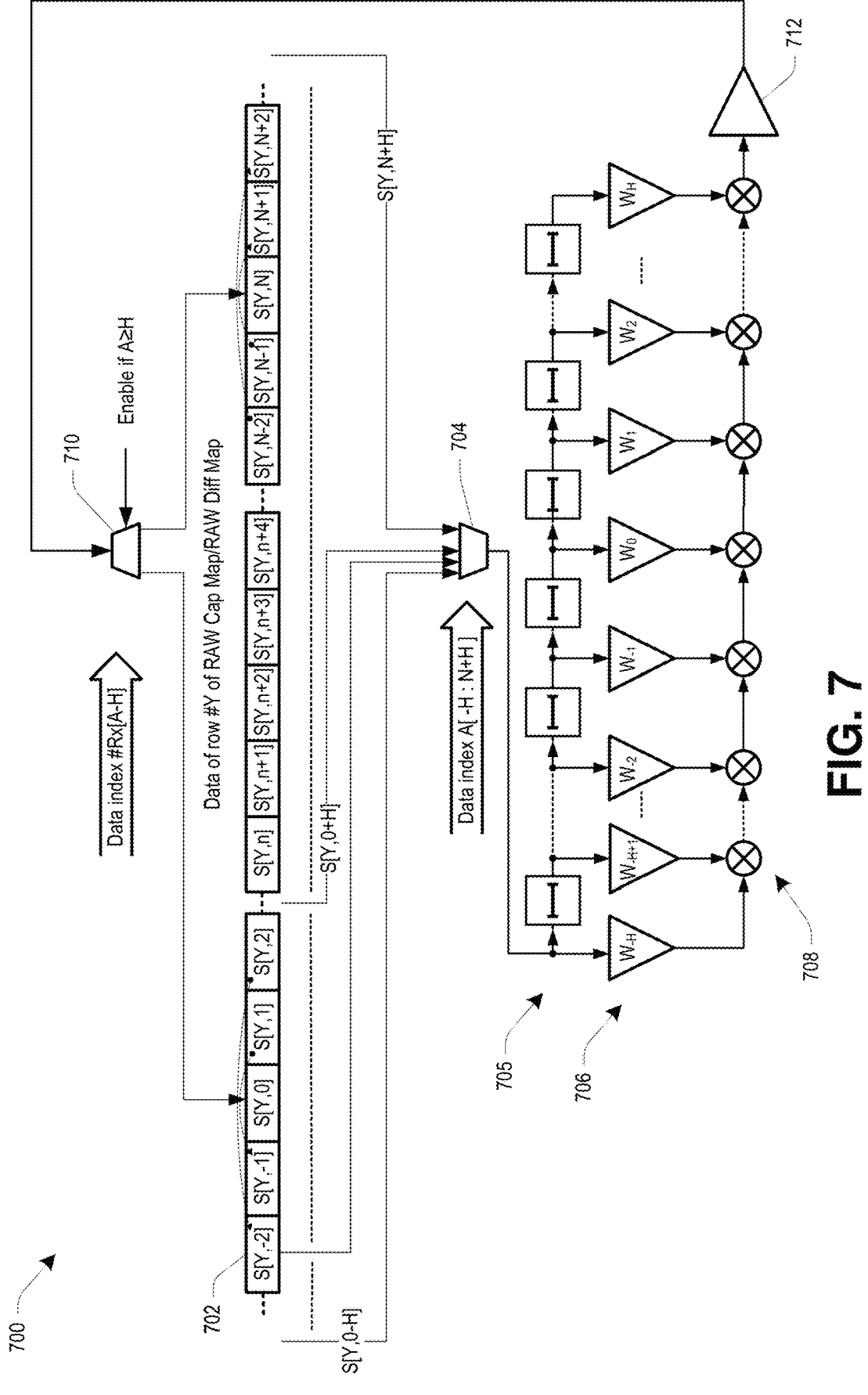

FIG. 7 is a simplified block diagram of a band pass filter 700, in accordance with some embodiments. The band pass filter 700 may be used to implement the X BPF 306 or the Y BPF 310. A memory block 702 stores a row or column of unit cell data and the virtual unit cell data at the edges of the row or column. The memory block 702 also stores the output data. A multiplexer 704 selects unit cell data to load a shift register 705. The number of elements in the shift register 705 corresponds to the width of the sliding window 506. Gain units 706 set the weights of the filter taps. Summation units

708 add the weighted components. A scaling unit 710 applies a global scaling factor. An output multiplexer 712 maps the filter output to an entry in the memory block 702 corresponding to the target unit cell. Since the index of the data sent to the shift register 705 is greater than the index of the target unit cell, the output data can overwrite the unit cell data in the memory block 702. For the X BPF 306, the memory block 702 stores a row of the raw capacitance map 118 and is replaced by a row of the X-direction difference map 308. For the Y BPF 310, the memory block 702 stores a column of the x-direction difference map 308 and is replaced by a column of the y-direction difference map 312. The BPF 700 of FIG. 7 uses less memory and fewer multiplexers than the BPF 600 of FIG. 6.

Figure 8:
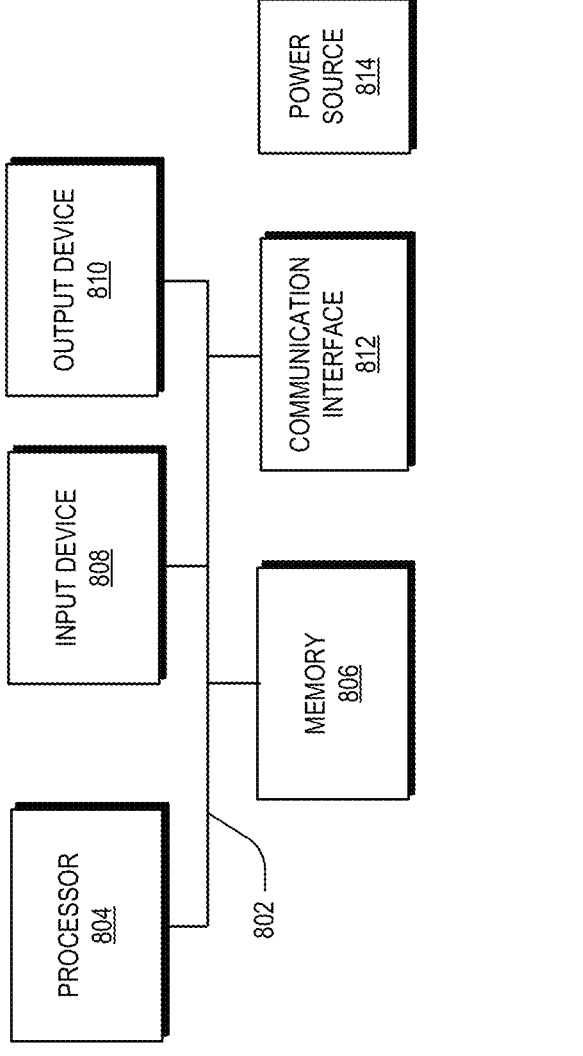
FIG. 8 is a diagram of a processing unit, in accordance with some embodiments.
Figure 8:

FIG. 8 is a diagram of a processing unit 800, in accordance with some embodiments. The processing unit 800 may implement one or more of the SPU 112, the capacitance map processing unit 114, or the post processing unit 116. In some embodiments, the processing unit 800 comprises a bus 802, a processor 804 (e.g., the processor 126), a memory 806 that stores software instructions or operations, an input device 808, an output device 810, a communication interface 812, and a power source 814, such as a battery. The processor 804 receives sensor data and implements a software application that processes the sensor data, for example, to generate one of the maps 118, 120. The processing unit 800 may include fewer components, additional components, different components, and/or a different arrangement of components than those illustrated in FIG. 8.

According to some embodiments, the bus 802 includes a path that permits communication among the components of the processing unit 800. For example, the bus 802 may include a system bus, an address bus, a data bus, and/or a control bus. The bus 802 may also include bus drivers, bus arbiters, bus interfaces, clocks, and so forth. The processor 804 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 804 may be implemented as hardware (e.g., a microprocessor, etc.), a combination of hardware and software (e.g., a SoC, an ASIC, etc.), may include one or multiple memories (e.g., cache, etc.), etc.

The processor 804 performs one or multiple operations based on an operating system and/or various applications or computer programs (e.g., software). The processor 804 accesses instructions from the memory 806, from other components of the processing unit 800, and/or from a source external to the processing unit 800 (e.g., a network, another device, etc.). The processor 804 may perform an operation and/or a process based on various techniques including, for example, multithreading, parallel processing, pipelining, interleaving, etc.

In some embodiments, the memory 806 includes one or multiple memories and/or one or multiple other types of storage mediums. For example, the memory 806 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory

806 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 806 may include drives for reading from and writing to the storage medium. The memory 806 may be external to and/or removable from the processing unit 800, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 806 may store data, software, and/or instructions related to the operation of the touch sensing system 100.

The communication interface 812 permits the processing unit 800 to communicate with other devices, networks, systems, sensors, and/or the like on a network. The communication interface 812 may include one or multiple wireless interfaces and/or wired interfaces. For example, the communication interface 812 may include one or multiple transmitters and receivers, or transceivers. The communication interface 812 may operate according to a protocol stack and a communication standard. In some embodiments, the communication interface 812 includes an antenna. The communication interface 812 may include various processing logic or circuitry (e.g., multiplexing/de-multiplexing, filtering, amplifying, converting, error correction, etc.). In some embodiments, the communication interface 812 operates using one or more of a long range wireless protocol, a short range wireless protocol, or a wired protocol.

In some embodiments, the input device 808 permits an input into the processing unit 800. For example, the input device 808 may comprise a keyboard, a mouse, a display, a touchscreen, a touchless screen, a button, a switch, an input port, speech recognition logic, and/or some other type of suitable visual, auditory, or tactile input component. The touch sensor array 102 may be incorporated into the input device 808. The output device 810 permits an output from the processing unit 800. For example, the output device 810 may include a speaker, a display, a touchscreen, a touchless screen, a projected display, a light, an output port, and/or some other type of suitable visual, auditory, or tactile output component.

Figure 9:
FIG. 9 is a flow chart illustrating an example method for touch detection, in accordance with some embodiments.
Figure 9:
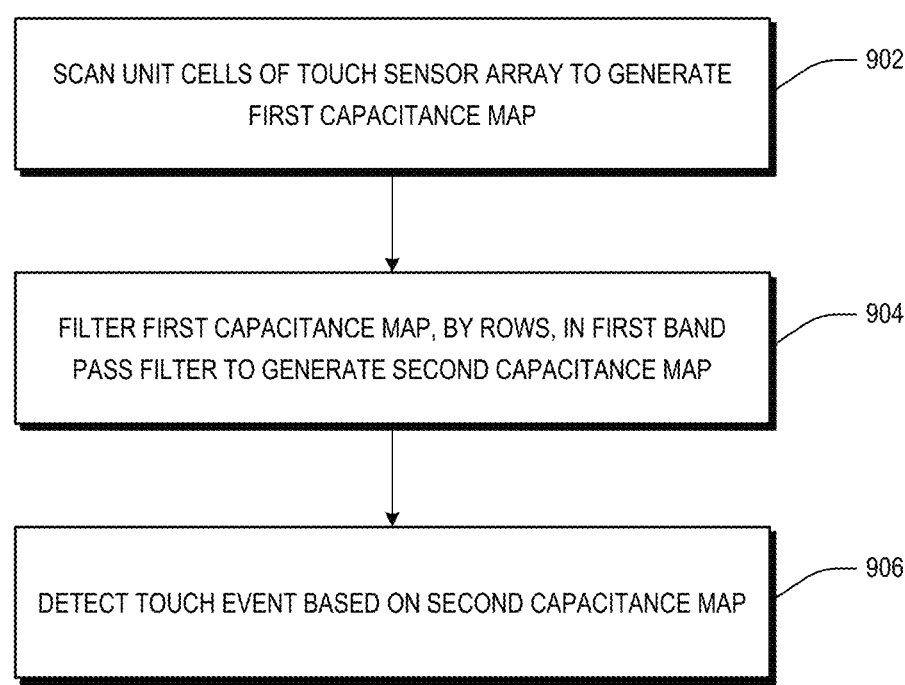

FIG. 9 is a flow chart illustrating an example method 900 for touch detection, in accordance with some embodiments. At 902, unit cells of a touch sensor array are scanned to generate a first capacitance map 118. At 904, the first capacitance map 118 is filtered, by rows, in a first band pass filter 306 to generate a second capacitance map 308. At 906, a touch event is detected based on the second capacitance map 308.

Figure 10:
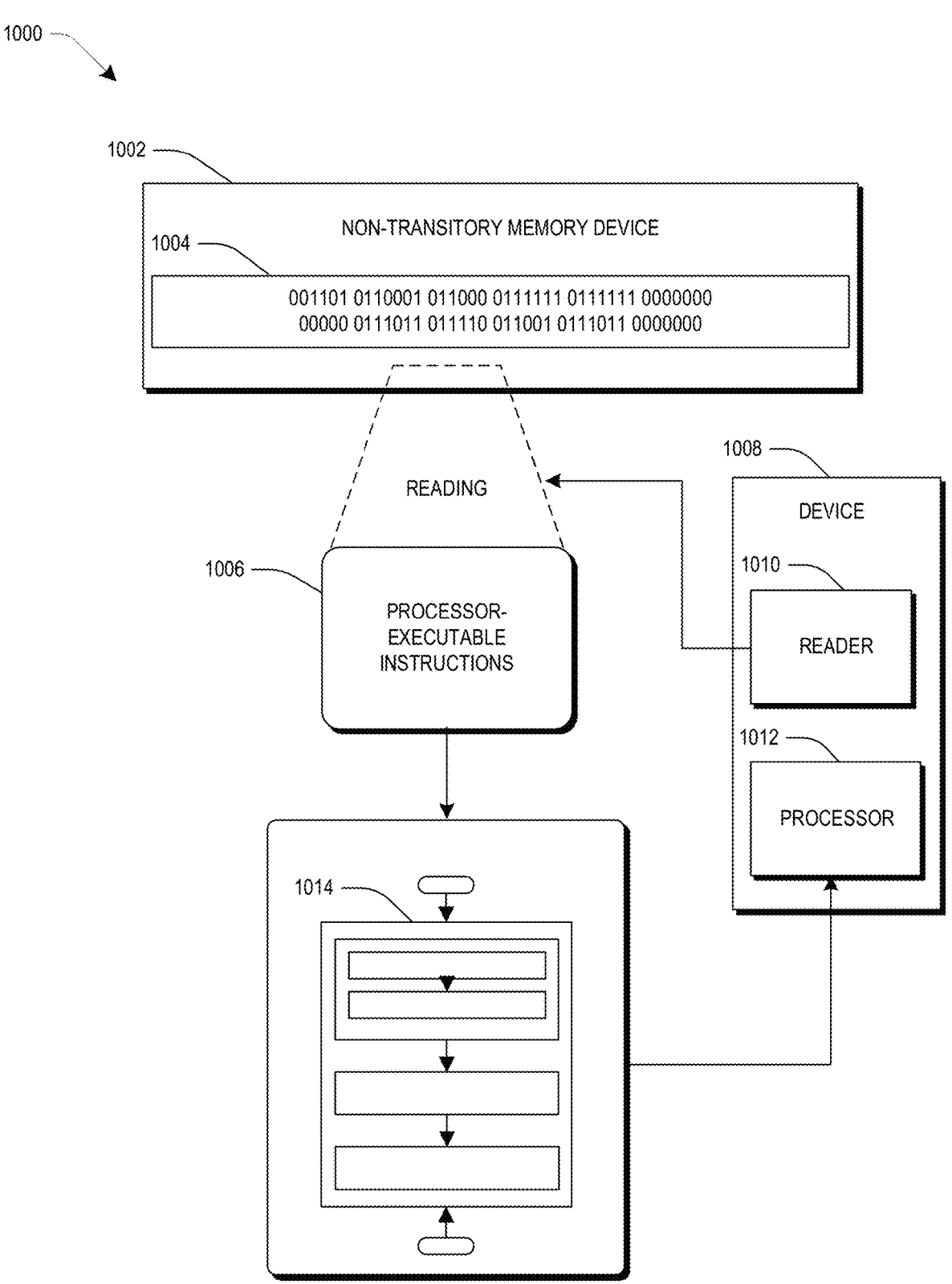
FIG. 10 illustrates an exemplary embodiment of a computer-readable medium, in accordance with some embodiments.

FIG. 10 illustrates an exemplary embodiment 1000 of a computer-readable medium 1002, in accordance with some embodiments. One or more embodiments involve a computer-readable medium comprising processor-executable instructions configured to implement one or more of the techniques presented herein. The embodiment 1000 comprises a non-transitory computer-readable medium 1002 (e.g., a CD-R, DVD-R, flash drive, a platter of a hard disk drive, etc.), on which is encoded computer-readable data 1004. This computer-readable data 1004 in turn comprises a set of processor-executable computer instructions 1006 that, when executed by a computing device 1008 including a reader 1010 for reading the processor-executable computer instructions 1006 and a processor 1012 for executing the processor-executable computer instructions 1006, are configured to facilitate operations according to one or more of the principles set forth herein. In some embodiments, the processor-executable computer instructions 1006, when executed, are configured to facilitate performance of a method 1014, such as at least some of the aforementioned method(s). In some embodiments, the processor-executable computer instructions 1006, when executed, are configured to facilitate implementation of a system, such as at least some of the one or more aforementioned system(s). Many such computer-readable media may be devised by those of ordinary skill in the art that are configured to operate in accordance with the techniques presented herein.

In an embodiment of the techniques presented herein, a method for touch detection comprises scanning unit cells of a touch sensor array to generate a first capacitance map, filtering the first capacitance map, by rows, in a first band pass filter to generate a second capacitance map, and detecting a touch event based on the second capacitance map.

In an embodiment of the techniques presented herein, the method comprises filtering the second capacitance map, by columns, in a second band pass filter to generate a third capacitance map, and detecting the touch event based on the third capacitance map.

In an embodiment of the techniques presented herein, the touch sensor array comprises transmit lines and receive lines perpendicular to the transmit lines, the unit cells are defined at intersections between the transmit lines and the receive lines, filtering the first capacitance map, by rows, comprises filtering the first capacitance map in a first direction corresponding to the receive lines; and filtering the second capacitance map, by columns, comprises filtering the second capacitance map in a second direction corresponding to the transmit lines.

In an embodiment of the techniques presented herein, the method comprises performing a calibration process on the touch sensor array to generate a baseline map, subtracting the baseline map from the first capacitance map to generate a third capacitance map, and detecting the touch event based on the third capacitance map.

In an embodiment of the techniques presented herein, the touch sensor array comprises transmit lines and receive lines perpendicular to the transmit lines, the unit cells are defined at intersections between the transmit lines and the receive lines, and filtering the first capacitance map, by rows, in the first band pass filter comprises filtering data for a first row of unit cells associated with the intersections of a selected transmit line with the receive lines.

In an embodiment of the techniques presented herein, filtering the first capacitance map, by rows, in the first band pass filter comprises storing a first row of the first capacitance map in a memory block, selecting a window of data elements in the memory block, generating a filter output for the window, and sliding the window through the memory block and iterating the generating of the filter output.

In an embodiment of the techniques presented herein, filtering the first capacitance map, by rows, in the first band pass filter comprises mirroring data adjacent a first edge of the first row in the memory block and mirroring data adjacent a second edge of the first row in the memory block.

In an embodiment of the techniques presented herein, filtering the first capacitance map, by rows, in the first band pass filter comprises applying a tap weighting factor to each of the data elements to generate weighted data elements and summing the weighted data elements to generate the filter output.

In an embodiment of the techniques presented herein, filtering the first capacitance map, by rows, in the first band pass filter comprises storing the window of data elements in a shift register and storing the filter output in the memory block.

In an embodiment of the techniques presented herein, a touch detection system, comprises a touch sensor array comprising unit cells, a transmit sequencer configured to generate an excitation signal, an analog-to-digital-converter unit configured to measure responses of the unit cells to the excitation signal, and a processing unit configured to generate a first capacitance map based on the responses, filter the first capacitance map, by rows, in a first band pass filter to generate a second capacitance map, and detect a touch event based on the second capacitance map.

In an embodiment of the techniques presented herein, the processing unit is configured to filter the second capacitance map, by columns, in a second band pass filter to generate a third capacitance map and detect the touch event based on the third capacitance map.

In an embodiment of the techniques presented herein, the touch sensor array comprises transmit lines and receive lines perpendicular to the transmit lines, the unit cells are defined at intersections between the transmit lines and the receive lines, and the processing unit is configured to filter the first capacitance map, by rows, in a first direction corresponding to the receive lines, and filter the second capacitance map, by columns, in a second direction corresponding to the transmit lines.

In an embodiment of the techniques presented herein, the processing unit is configured to perform a calibration process on the touch sensor array to generate a baseline map, subtract the baseline map from the first capacitance map to generate a third capacitance map, and detect the touch event based on the third capacitance map.

In an embodiment of the techniques presented herein, the touch sensor array comprises transmit lines and receive lines perpendicular to the transmit lines, the unit cells are defined at intersections between the transmit lines and the receive lines, and the processing unit is configured to filter the first capacitance map by filtering data for a first row of unit cells associated with the intersections of a selected transmit line with the receive lines.

In an embodiment of the techniques presented herein, the processing unit is configured to filter the first capacitance map, by rows, in the first band pass filter by storing a first row of the first capacitance map in a memory block, selecting a window of data elements in the memory block, generating a filter output for the window, and sliding the window through the memory block and iterating the generating of the filter output.

In an embodiment of the techniques presented herein, the processing unit is configured to filter the first capacitance map, by rows, in the first band pass filter by mirroring data adjacent a first edge of the first row in the memory block and mirroring data adjacent a second edge of the first row in the memory block.

In an embodiment of the techniques presented herein, the processing unit is configured to filter the first capacitance map, by rows, in the first band pass filter by applying a tap weighting factor to each data elements to generate weighted data elements, and summing the weighted data elements to generate the filter output.

In an embodiment of the techniques presented herein, the processing unit is configured to filter the first capacitance map, by rows, in the first band pass filter by storing the window of data elements in a shift register and storing the filter output in the memory block.

In an embodiment of the techniques presented herein, a touch detection system comprises a display comprising a touch sensor array having transmit lines and receive lines, a transmit sequencer configured to generate excitation signals, by transmit line, on the touch sensor array, an analog-to-digital-converter unit configured to measure responses of the receive lines to the excitation signals, and a processing unit configured to generate a first capacitance map based on the responses, filter the first capacitance map, by rows, in a first band pass filter to generate a second capacitance map, and detect a touch event based on the second capacitance map.

In an embodiment of the techniques presented herein, the receive lines are perpendicular to the transmit lines, the unit cells are defined at intersections between the transmit lines and the receive lines, and the processing unit is configured to filter the first capacitance map, by rows, in a first direction corresponding to the receive lines, filter the second capacitance map, by columns, in a second band pass filter in a second direction corresponding to the transmit lines to generate a third capacitance map, and detect the touch event based on the third capacitance map.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for touch detection, comprising:
scanning unit cells of a touch sensor array to generate a first capacitance map;
filtering the first capacitance map, by rows, in a first band pass filter to generate a second capacitance map, wherein filtering the first capacitance map comprises:
storing a first row of the first capacitance map in a memory block,
selecting a window of data elements in the memory block,
generating a filter output for the window, and
sliding the window through the memory block and iterating the generating of the filter output; and
detecting a touch event based on the second capacitance map.

2. The method of claim 1, comprising:
filtering the second capacitance map, by columns, in a second band pass filter to generate a third capacitance map; and
detecting the touch event based on the third capacitance map.

3. The method of claim 2, wherein:
the touch sensor array comprises transmit lines and receive lines perpendicular to the transmit lines;
the unit cells are defined at intersections between the transmit lines and the receive lines;
filtering the first capacitance map, by rows, comprises filtering the first capacitance map in a first direction corresponding to the receive lines; and
filtering the second capacitance map, by columns, comprises filtering the second capacitance map in a second direction corresponding to the transmit lines.

4. The method of claim 1, comprising:

performing a calibration process on the touch sensor array to generate a baseline map;

subtracting the baseline map from the first capacitance map to generate a third capacitance map; and detecting the touch event based on the third capacitance map.

5. The method of claim 1, wherein:

filtering the first capacitance map, by rows, in the first band pass filter comprises:

mirroring data adjacent a first edge of the first row in the memory block; and mirroring data adjacent a second edge of the first row in the memory block.

6. The method of claim 1, wherein:

filtering the first capacitance map, by rows, in the first band pass filter comprises:

applying a tap weighting factor to each of the data elements to generate weighted data elements; and summing the weighted data elements to generate the filter output.

7. The method of claim 1, wherein:

filtering the first capacitance map, by rows, in the first band pass filter comprises:

storing the window of data elements in a shift register; and storing the filter output in the memory block.

8. A touch detection system, comprising:

a touch sensor array comprising unit cells;

a transmit sequencer configured to generate an excitation signal;

an analog-to-digital-converter unit configured to measure responses of the unit cells to the excitation signal; and a processing unit configured to:

generate a first capacitance map based on the responses;

filter the first capacitance map, by rows, in a first band pass filter to generate a second capacitance map, wherein the filtering of the first capacitance map is by:

storing a first row of the first capacitance map in a memory block, selecting a window of data elements in the memory block, generating a filter output for the window, and sliding the window through the memory block and iterating the generating of the filter output; and detect a touch event based on the second capacitance map.

9. The system of claim 8, wherein:

the processing unit is configured to:

filter the second capacitance map, by columns, in a second band pass filter to generate a third capacitance map; and detect the touch event based on the third capacitance map.

10. The system of claim 9, wherein:

the touch sensor array comprises transmit lines and receive lines perpendicular to the transmit lines;

the unit cells are defined at intersections between the transmit lines and the receive lines; and the processing unit is configured to:

filter the first capacitance map, by rows, in a first direction corresponding to the receive lines; and filter the second capacitance map, by columns, in a second direction corresponding to the transmit lines.

11. The system of claim 8, wherein:

the processing unit is configured to:

perform a calibration process on the touch sensor array to generate a baseline map;

subtract the baseline map from the first capacitance map to generate a third capacitance map; and detect the touch event based on the third capacitance map.

12. The system of claim 8, wherein:

the processing unit is configured to filter the first capacitance map, by rows, in the first band pass filter by:

mirroring data adjacent a first edge of the first row in the memory block; and mirroring data adjacent a second edge of the first row in the memory block.

13. The system of claim 8, wherein:

the processing unit is configured to filter the first capacitance map, by rows, in the first band pass filter by:

applying a tap weighting factor to each data elements to generate weighted data elements; and summing the weighted data elements to generate the filter output.

14. The system of claim 8, wherein:

the processing unit is configured to filter the first capacitance map, by rows, in the first band pass filter by:

storing the window of data elements in a shift register; and storing the filter output in the memory block.

15. A touch detection system, comprising:

a display comprising a touch sensor array having transmit lines and receive lines;

a transmit sequencer configured to generate excitation signals, by transmit line, on the touch sensor array;

an analog-to-digital-converter unit configured to measure responses of the receive lines to the excitation signals; and a processing unit configured to:

generate a first capacitance map based on the responses;

filter the first capacitance map, by rows, in a first band pass filter to generate a second capacitance map, wherein the filtering of the first capacitance map is by:

storing a first row of the first capacitance map in a memory block, selecting a window of data elements in the memory block, generating a filter output for the window, and sliding the window through the memory block and iterating the generating of the filter output; and detect a touch event based on the second capacitance map.

16. The system of claim 15, wherein:

the receive lines are perpendicular to the transmit lines;

the unit cells are defined at intersections between the transmit lines and the receive lines; and the processing unit is configured to:

filter the first capacitance map, by rows, in a first direction corresponding to the receive lines;

filter the second capacitance map, by columns, in a second band pass filter in a second direction corresponding to the transmit lines to generate a third capacitance map; and detect the touch event based on the third capacitance map.

* * * * *